3,202,722
PREPARATION OF BERYLLIUM ALKYLS

David H. Campbell and Byron R. Lowrance, Baton Rouge, La., assignors to Ethyl Corporation, New York, N.Y., a corporation of Virginia
No Drawing. Filed Apr. 27, 1962, Ser. No. 190,832
3 Claims. (Cl. 260—665)

This invention relates to the provision of a novel and improved method for the preparation of beryllium alkyls.

In the past, one of the standard procedures for the preparation of beryllium alkyls has been the reaction of a beryllium halide with the appropriate Grignard reagent. With this method are associated the well-known disadvantages of the Grignard procedure, particularly the fact that the product is obtained in the form of an etherate from which the preparation of the ether-free product is a matter of considerable difficulty. Coates and Glockling (J. Chem. Soc., 1954, 22, 2526) modified the Grignard procedure by the use of a special distillation technique for removing most of the ether. The ether-free compound was then prepared by treatment of the etherate with excess beryllium chloride.

Another procedure occasionally used was the reaction of dialkyl- or diarylmercury with metallic beryllium (Lavroff, J. Russ. Phys. Chem. Soc. 16, 93 (1884)); Gilman and Schulze, J. Chem. Soc. (London) 1927, 2663). This method was characterized by low reaction rates and low yields, and the situation was not greatly improved by the addition of catalytic amounts of mercuric chloride to the reaction mixture. Other methods have been attempted but none have met with any great measure of success. In general, they suffered from low yield and from difficulties inherent in the isolation of the product.

Accordingly, it is an object of the present invention to provide a method for preparing beryllium alkyls which does not suffer from the aforementioned difficulties. Another object of this invention is to provide a method for preparing beryllium alkyls in high yield and in an easily recoverable form. Still another object is to provide a novel catalyst for the preparation of beryllium alkyls from metallic beryllium and the appropriate mercury alkyls. Additional objects will appear hereinafter.

The process of the present invention comprises preparing a diorganoberyllium compound by the reaction of metallic beryllium with the corresponding diorganomercury compound, the reaction being carried out in the presence of an iodine-containing catalyst. Another embodiment of the present invention is the preparation of diethyl beryllium by the reaction of beryllium metal with diethyl mercury in the presence of beryllium iodide as a catalyst. Still another embodiment of this invention is the formation of diethyl beryllium from metallic beryllium and diethyl mercury in the presence, as catalyst, of beryllium iodide which is prepared in situ by the addition of elementary iodine to the reaction mixture. Still other embodiments will appear hereinafter.

The method of beryllium alkyl synthesis herein disclosed offers a number of distinct advantages over hitherto available methods. In particular, it is characterized by simplicity of operation. The reaction occurs in a single stage, thus avoiding the necessity for the preparation and subsequent disposal of intermediates such as arises when the Grignard method is used. Furthermore, the reaction yields the product in its final state, no complex being formed which requires special techniques for subsequent resolution. Then too, as a result of the foregoing advantages, the process of this invention is less costly to carry out than processes previously disclosed.

The invention will be more fully understood by reference to the following illustrative examples in which all parts and percentages are by weight.

Example I

About 2 grams of beryllium chips and one or two crystals of iodine were placed in a 200-ml. flask and covered with ether. Stirring was begun and continued for about 30 minutes or until the iodine color had disappeared. The ether was then removed as completely as possible by distillation. About 20 ml. of diethyl mercury was then added and the mixture was heated to 100–110° C. and stirred continuously for about 24 hours. Beryllium metal is less dense than diethyl mercury, but after the reaction had proceeded for about an hour, the metal had sunk to the bottom of the liquid. The formation of diethyl beryllium was always indicated by the appearance of mercury and by the high reactivity of the vapors in the flask toward traces of oxygen. Unreacted diethyl mercury was removed by distillation at reduced pressure. The diethyl beryllium product was separated from the solid residues by centrifugation.

Di-tert-butyl beryllium and dibenzyl beryllium can be prepared in the manner described in the above example from metallic beryllium and the corresponding organomercury compounds.

Example II

The experiment described in Example I was repeated, except for the omission of the iodine crystals. There was little evidence of reaction, and only trace amounts of diethyl beryllium were obtained.

The metallic beryllium of the present invention may be used in any of a variety of forms differing in their degree of subdivision and in reactivity. Thus, it may be used in bulk, or in the form of chips, turnings, powder or dust. Chips or turnings are preferred, in general, because the bulk metal reacts so slowly as to be of no practical utility, whereas the powder and dust are difficult to obtain in a form uncontaminated by oxide.

A considerable variety of organomercury compounds can be used in the practice of the present invention. Included are all hydrocarbon mercury compounds having 2 to 18 carbon atoms in each hydrocarbon radical. Such compounds may include primary, secondary, and tertiary alkyl derivatives and simple and condensed-ring aryl derivatives, as well as saturated and unsaturated cycloalkyl derivatives. Examples of such compounds are diisobutyl mercury, di-n-hexyl mercury, bis(1,1-dimethylhexyl) mercury, bis-n-dodecyl mercury, dicetyl mercury, dioctadecyl mercury, diphenyl mercury, bis(2,4-xylyl)mercury, diphenethyl mercury, di-alphanaphthayl mercury, dicyclohexyl mercury, dicyclohexenyl mercury, and dicyclopentadienyl mercury.

Metal halides have been found to catalyze the reaction of metallic beryllium with organomercury compounds and to increase the yield thereof. The iodides are most efficient in this respect and, of these, beryllium iodide is particularly preferred because of the high yield and ease of recovery of product associated with its use. Thus, as indicated above, when metallic beryllium is contacted with diethylmercury in the absence of a catalyst, only trace yields are obtained. When a small amount of mercuric chloride is added to the reaction mixture, the yield of diethylberyllium is 3.2%, whereas an equivalent amount of iodine as berryllium iodide results in a yield of 35%.

The beryllium iodide catalyst may be employed in amounts ranging from trace quantities to seventy percent or more by weight, based on the metallic beryllium employed in the reaction. Amounts of three to twenty percent are preferred since, when smaller amounts are used, the yields are rather erratic, whereas the increases in yield and reaction rate obtained with larger amounts, while significant, do not justify the cost of the additional catalyst.

As indicated above, the reactions of this invention can be carried out in the absence of solvents. However, solvents can be used, if desired, provided that they are liquid under the reaction conditions and that they are inert to both reactants and products. Accordingly, the solvents may include paraffinic hydrocarbons such as n-nonane, 2,2,4-trimethylhexane, n-decane, n-dodecane, n-tetradecane, n-cetane, and the like; cycloalkanes, such as cyclohexane, methylcyclohexane, cycloheptane, and the like; aromatic hydrocarbons such as toluene, o-xylene, cumene, mesitylene, and the like; and tertiary amine derivatives such as pyridine, quinoline, N,N-dimethyl aniline, and the like.

The reactions of this invention may be carried out at any temperature sufficient to result in the formation of hydrocarbon berryllium compounds which is within the range of stability of the reactants and products or within the liquid range of the solvents under the reactions conditions if solvents are employed. Satisfactory results can be obtained at temperatures ranging from 90° C. or below to 150° C. or above. However, temperatures of 100° to 120° C. are preferred because within this range the reaction proceeds at a practical rate with a minimum of thermal decomposition of the product.

The reactions of the invention usually proceed at satisfactory rates under atmospheric pressure, but pressures ranging from less than 5 mm. of mercury to more than 10 atmospheres may be used if desired.

The reaction period may vary over a considerable range. Periods of 6 hours or less to 24 hours or more may be used, those of 18 to 30 hours being preferred for the following reasons. The reaction rate is so small that adequate yields are not obtained in much less than 18 hours, whereas product decomposition begins to be significant after 24 hours, with resultant decrease in yield.

The proportions of the reactants may vary from a tenfold or greater excess of the metallic beryllium to a tenfold or greater excess of the hydrocarbon mercury compound, but a 1–5 percent excess of the hydrocarbon mercury compound is preferred bcause of the ease of separation of the excess from the product. The reactions of the invention may be carried out under any atmosphere inert to both reactants and products. The use of dry nitrogen is preferred because of its availability and economy. Other suitable protective atmosphere include gaseous saturated hydrocarbons, such as methane and ethane and the noble gases helium, neon, argon, krypton, and xenon.

The order of addition of the reactants to the reactor is of no particular consequence since the reaction is so slow that addition usually is complete before any significant amount of reaction has occurred. However, since it is in general easier to add a liquid to a solid than the reverse, it is preferred to add the mercury alkyl (or its solution, if a solvent is employed) to the metallic beryllium.

The hydrocarbon beryllium compounds obtained by the process of this invention are useful as components of catalysts for the polymerization of olefins and as raw materials for the production of hydrocarbon beryllium compounds of higher molecular weight (see Ziegler, Belgian Patent No. 512,267, filed June 20, 1952). They can also be used for the metal plating of suitable substrates by thermal decomposition under suitable conditions in contact with said substrates.

Having thus described the process of this invention, it is not intended that it be limited except as set forth in the following claims.

We claim:
1. In the process for the preparation of a hydrocarbon beryllium compound having from 2 to 18 carbon atoms in each hydrocarbon radical by the reaction of metallic beryllium with the corresponding hyrocarbon mercury compound, the improvement which comprises carrying out the said reaction in contact with a beryllium iodide catalyst.
2. The process of claim 1 wherein the hydrocarbon beryllium compound is diethyl beryllium.
3. The process of claim 1 wherein the beryllium iodide cataylst is prepared in situ.

References Cited by the Examiner

Rabideau et al.: "Preparation of Pure Dimethylberyllium including a Survey of the Literature," U.S. Atomic Energy Commission, LA–1687, May 1954, Los Alamos Sci. Lab., University of Cal., Los Alamos, N.M., publ. by Tech. Information Service, Oak Ridge, Tenn.

TOBIAS E. LEVOW, *Primary Examiner.*

OSCAR R. VERTIZ, CARL D. QUARFORTH,
*Examiners.*